UNITED STATES PATENT OFFICE.

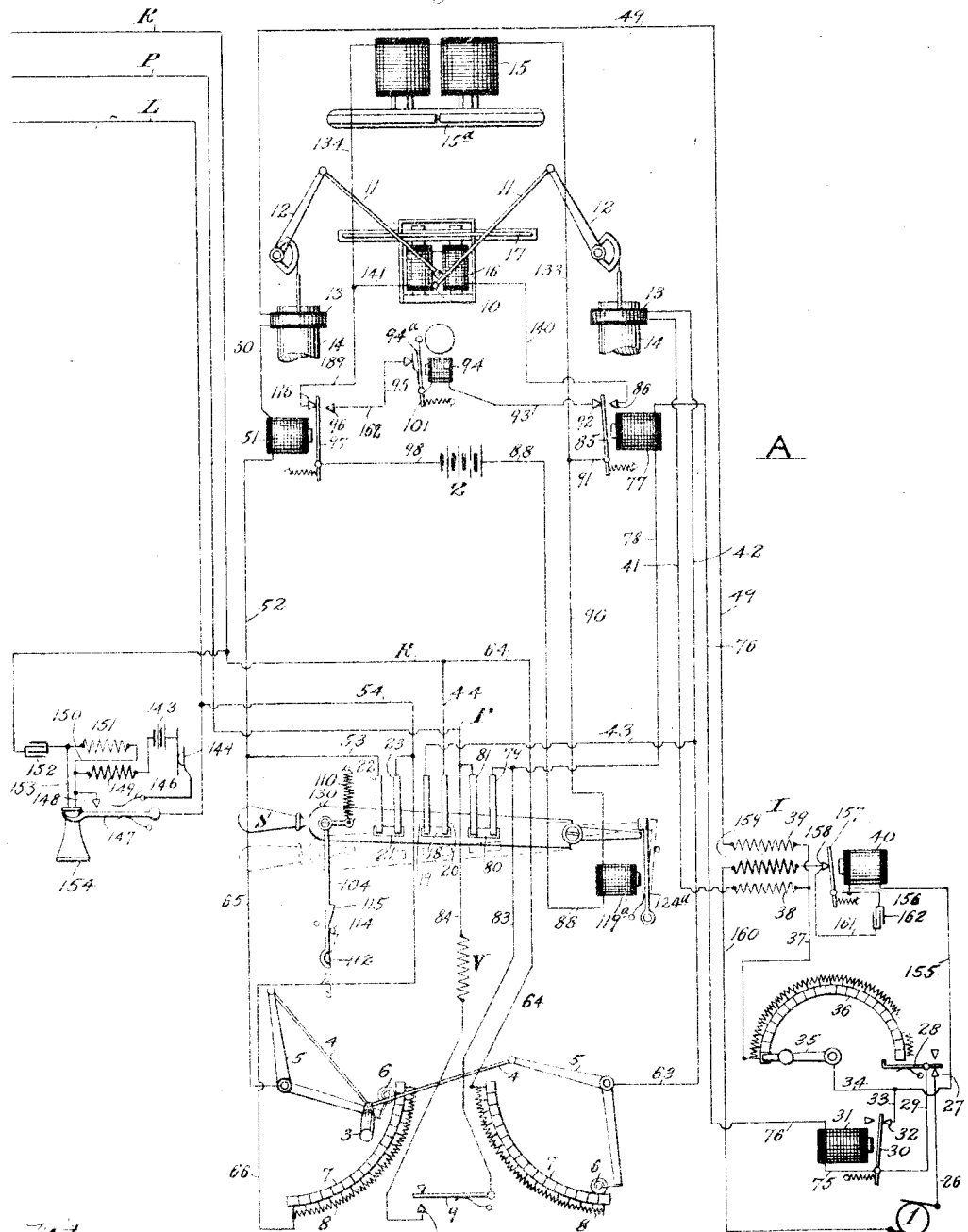

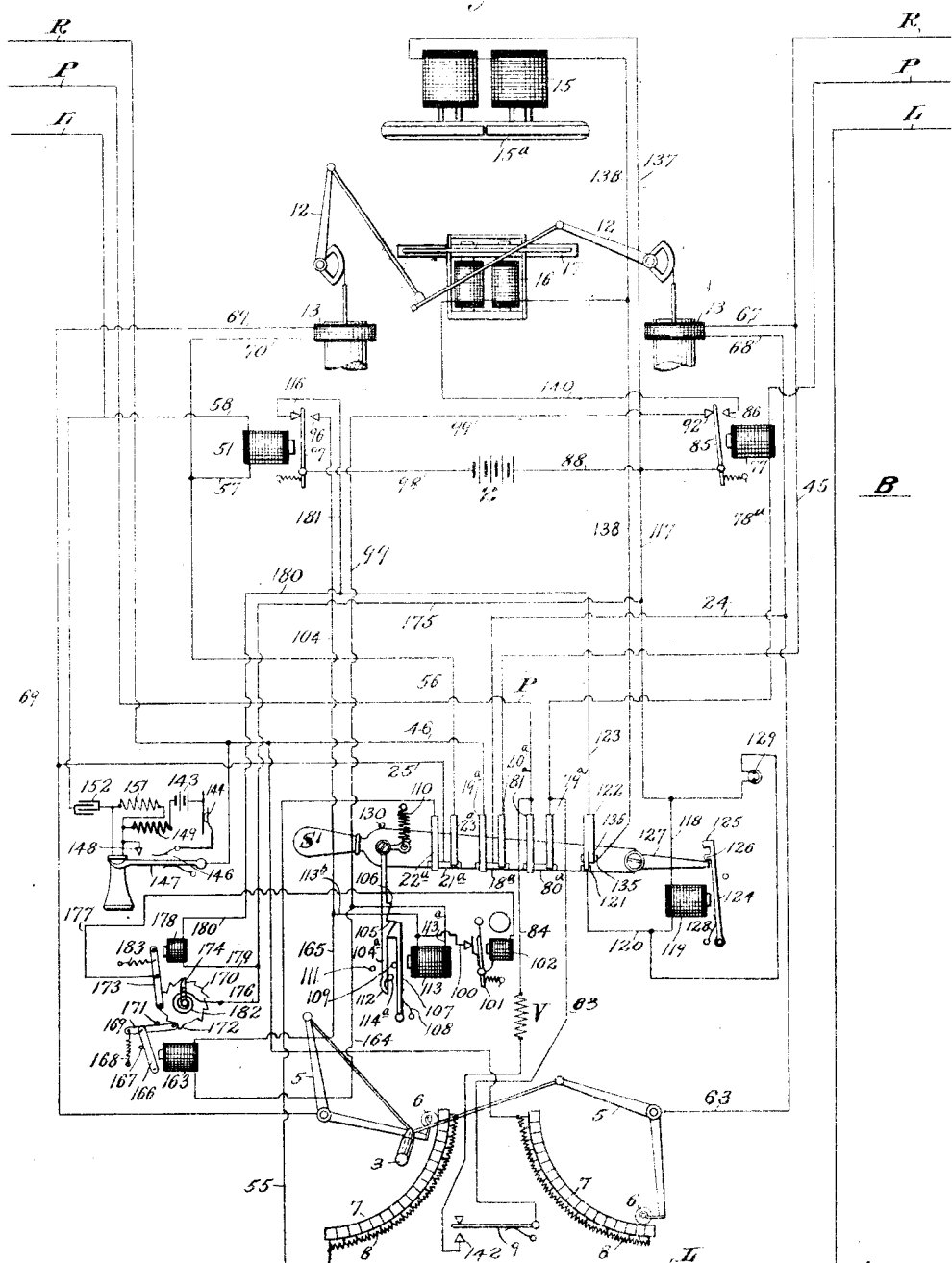

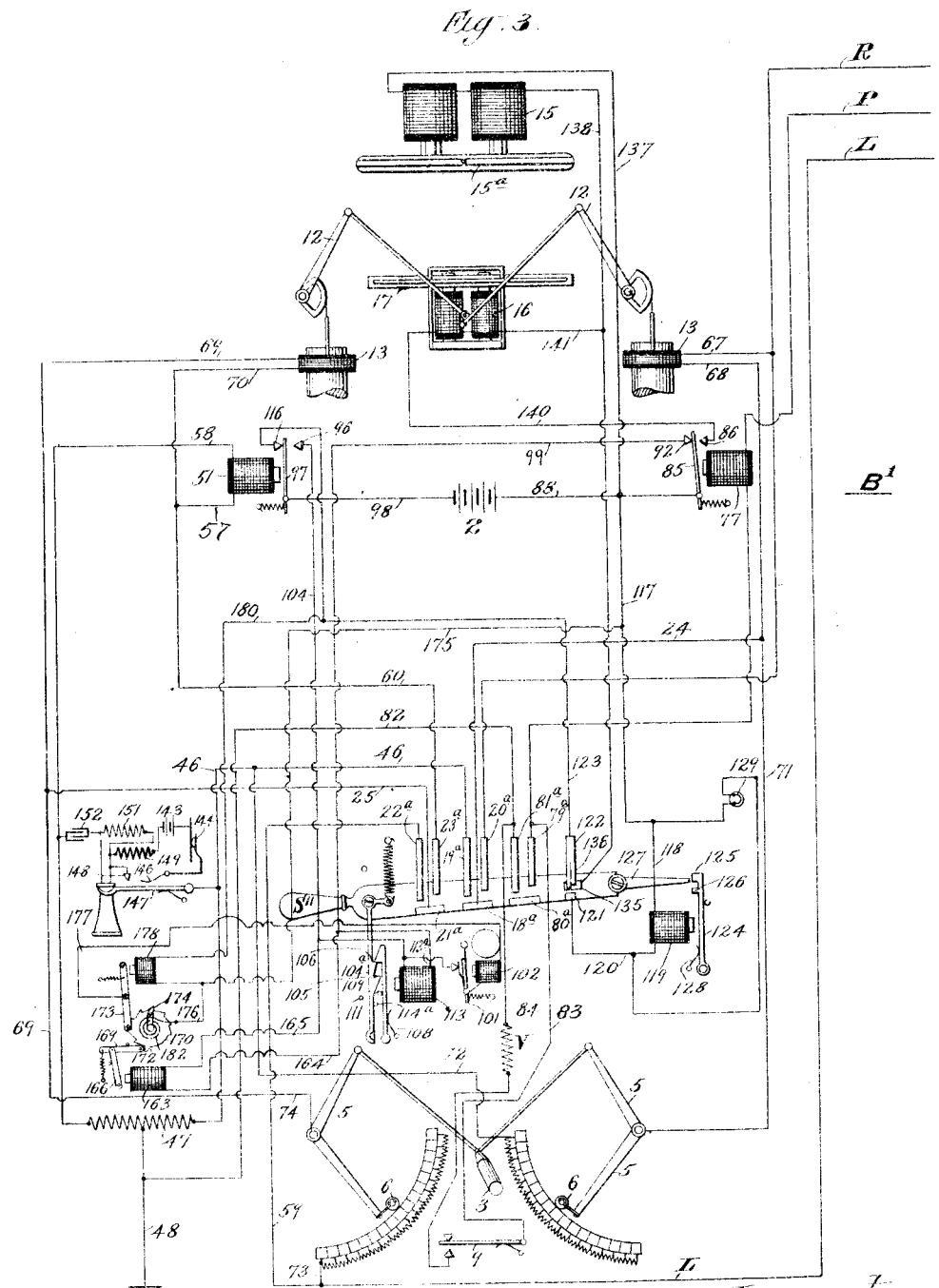

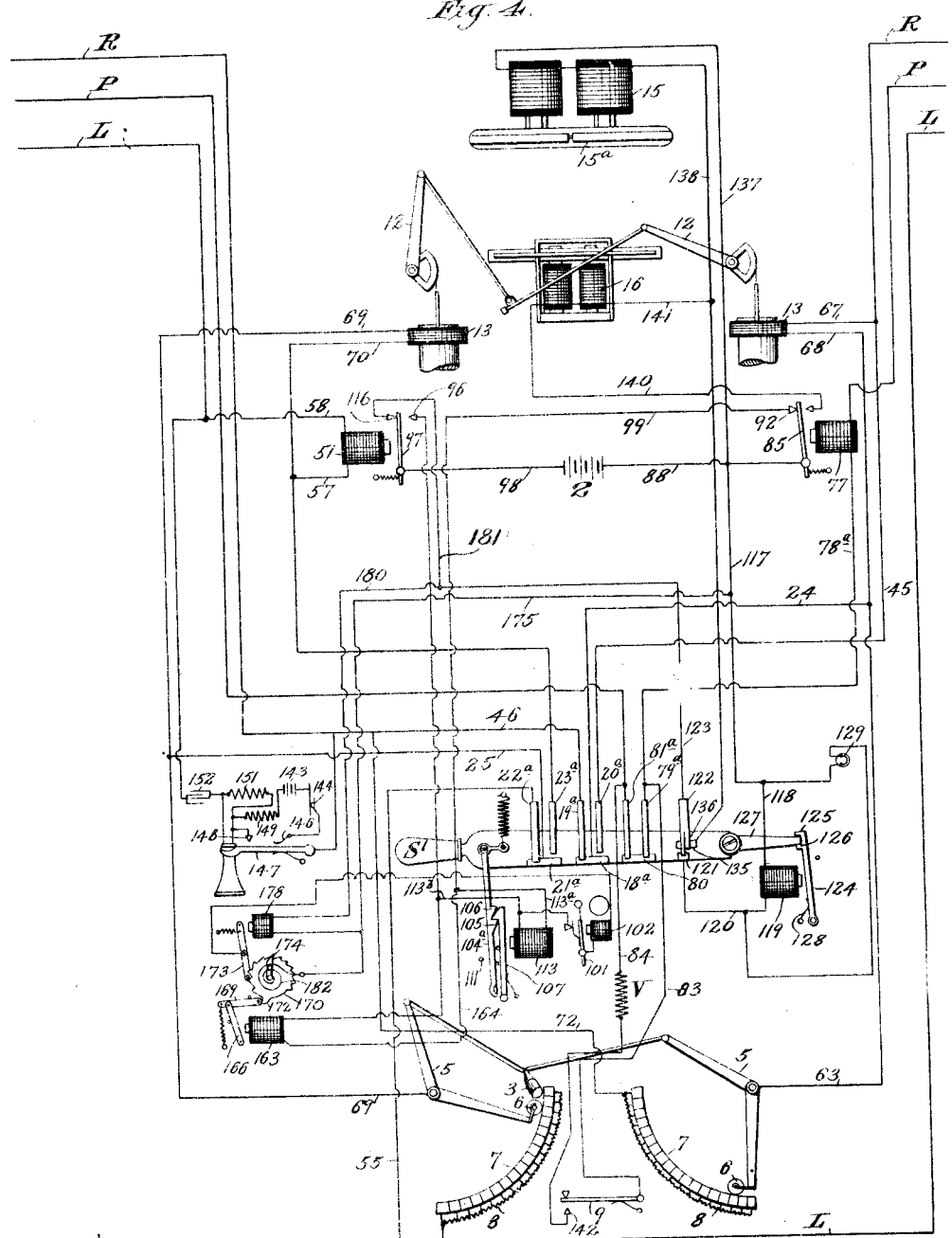

GEORGE STEELE TIFFANY, OF SUMMIT, NEW JERSEY, ASSIGNOR TO GRAY NATIONAL TELAUTOGRAPH COMPANY, OF NEW YORK, N. Y., A CORPORATION OF VIRGINIA.

TELAUTOGRAPHIC APPARATUS.

1,129,317.  Specification of Letters Patent.  Patented Feb. 23, 1915.

Application filed February 24, 1912. Serial No. 679,597.

*To all whom it may concern:*

Be it known that I, GEORGE S. TIFFANY, a citizen of the United States, residing at Summit, county of Union, and State of New Jersey, have invented certain new and useful Improvements in Telautographic Apparatus, fully described and represented in the following specification and the accompanying drawings, forming a part of the same.

This invention relates to improvements mainly in telautographic apparatus of the kind shown and described in my Letters Patent of the United States, Nos. 668,889, 668,890, and 668,895, granted February 26, 1901, and No. 954,159, granted April 5, 1910, that is to say, telautographic apparatus in which the movements of the receiving pen in unison with the transmitting tracer are effected by variations in the strength of currents sent to line from the transmitting instrument to the receiving instrument, such variations in current strength being in turn effected by and corresponding to the movements of the transmitting tracer.

The present invention relates more particularly to certain improvements in telautographic apparatus and systems suitable for train despatching purposes, though the invention is not limited to the function of train despatching alone but its features may be used for any purposes to which they are adaptable.

The accompanying drawings contain an illustration of a system embodying the several features of the said invention.

In the said drawings which illustrate a train despatching system consisting of a train despatcher's station and two distant or way stations,—Figure 1 is a diagrammatic view of the despatcher's station, the master switch thereof being shown in its normal, which is its receiving, position, and the several movable parts of the receiver in the positions which they assume when the receiver is recording a message sent from a way-station, as Fig. 3. Dotted lines are used to show the other or transmitting position of the switch, in which position the transmitter is in circuit with its own receiver as well as with the receiver of a way station. Fig. 2 is a diagrammatic view of a way-station, showing the master switch thereof in its normal position, that is, with both the transmitter and the receiver out of circuit, the various movable parts being shown in positions which they would assume with the switch in this position and current on the writing lines during the transmission of an autographic message from another way station to the despatcher's station, or vice versa. Fig. 3 is a diagrammatic view of a way-station, the main switch thereof being shown out of its normal position, which would be that of Fig. 2, and in transmitting position, that is, with its transmitter in circuit with its own receiver and with the receiver of the despatcher's station (Fig. 1); the various movable parts being shown in the positions which they would assume while this station is writing to the despatcher's station. There may be any number of way-stations in series relation to the despatcher's station. Figs. 1, 2 and 3 together show a system in the condition which would obtain when one of the way-stations, as that of Fig. 3, is writing to the despatcher's station, Fig. 3 being the way-station at the end of the line, and Fig. 2 an intermediate way-station. Fig. 4 is a diagrammatic view showing a way-station (as Fig. 2) with the master switch thereof in receiving position, that is, with the transmitter out of circuit and the receiver in circuit. In this position the receiver is ready to record a message sent from the transmitting station; but the parts are shown in the positions which they would assume with the master switch at the transmitting station still in normal position, there being consequently no current on the writing lines.

For convenience the transmitting station will be designated A and the way-stations B, B'. The connections between stations comprise three main line circuits, employing the three line wires R, L and P.

R and L are the writing lines, and may be termed right-hand line and left-hand line, respectively.

The line P serves for a variety of functions hereinafter referred to.

Current for the line circuits may be supplied by any suitable source 1, such as a motor generator, which may be located at the despatcher's station (Fig. 1), its negative brush being grounded. The despatcher's station and each of the way-stations are provided with a battery 2 or any other suitable source of electric energy for supplying the various local circuits. Each station comprises a transmitter and a receiver. The transmitter comprises a stylus or handle 3 which is connected by pivotal links 4 with two two-armed pivotally mounted levers 5, the latter carrying roller contacts 6 which with the bars 7 and resistance elements 8 constitute rheostats. As is well understood lateral movements of the transmitter stylus, in writing, through the rheostats, introduce more or less resistance into the right and left-hand writing lines, thus causing currents of varying strengths from current generator 1 to traverse these circuits and to operate the receiver or receivers in unison with the transmitter. In the unison position of the transmitting tracer of a station whose master switch has been moved to transmitting position, the roller contacts 6 are at the outer extremities (considered with relation to the source of electric energy) of the rheostats 7, 8, so that the maximum amount of resistance is then on the main writing lines, with the result that little, if any, current will then traverse these lines. Each transmitter has a platen switch 9, which as the transmitter stylus or the hand of the operator rests on the writing platen, during writing, is depressed from its normal, spring-raised position, in which it is shown. The receiver comprises a suitable marker 10, hereinafter referred to for convenience as a pen, operating over a platen (not shown) and connected by pivotal arms 11 with pivoted arms 12, the movements of which are controlled by coils 13 movable in a magnetic field represented by the pole pieces 14. The receiver arms 12 may, as usual, be acted on by springs (not shown) to restore them laterally and the pen to the normal or unison position shown in Fig. 2. The receiver also includes or has associated therewith paper-shifting device or magnet 15 and a pen-lifting device or magnet 16, such as shown and described in my application filed February 24, 1912, Serial Number 679,598. The paper-shifting magnet 15, when energized, operates to advance the paper (not shown) over the platen of the receiver through suitable paper-gripping devices 15ª moving with the armature of the magnet, and the pen-lifting magnet 16, when energized, moves a pen rest 17 away from the arms 11 so as to permit said arms, and with them the receiving pen 10, to move against the paper. When the pen-lifting magnet 16 is deënergized, its armature is moved away from it by a spring (not shown) so that the pen rest 17 will lift the pen away from the writing surface. All these pen-lifting parts, or record interrupting means, may be of known or suitable construction, and it is therefore unnecessary to illustrate and describe them in detail here.

Each station is provided with a master switch for cutting its transmitting and receiving instruments into and out of circuit. The switch of the despatcher's station (Fig. 1) is designated S, and the switches of the way-stations S¹. The switch S of the despatcher's station has but two positions, namely, the normal position illustrated in full lines in Fig. 1, which may be termed the receiving position, since then the receiver thereof is in and the transmitter thereof is out of circuit, and the shifted position indicated by dotted lines in Fig. 1, which may be termed its transmitting position, the transmitter then being in circuit and preferably also the receiver. The master switches S¹ of the way-stations have three positions, namely, the normal position shown in Fig. 2, in which both the transmitter and receiver are out of circuit; the second position shown in Fig. 4 which may be termed the receiving position, in which the transmitter is out of circuit and the receiver in circuit; and the third position shown in Fig. 3, which may be termed the transmitting position, in which the transmitter is in circuit and preferably also the receiver. The receiver of the transmitting station (Fig. 1) is preferably always in series with the right and left-hand wires, whether the master switch S be in the position indicated by full lines or that indicated by dotted lines in Fig. 1.

The master switch S of the despatcher's station is provided with a contact 18 which in the normal position of the switch bridges stationary contacts 19 and 20, thereby closing a shunt in the right-hand line R, thus in effect cutting out the right-hand side of the transmitter of that station. The switch S is also provided with a similar contact 21 which normally bridges stationary contacts 22 and 23, thereby closing a shunt, so that the left-hand side of said transmitter is cut out of circuit. When this master switch is moved to the dotted line position indicated in Fig. 1, the contacts 18 and 21 are separated from the stationary contacts 19, 20 and 22, 23, thereby opening the shunts and introducing the two sides of the transmitter into the right and left-hand lines.

The master switch S¹ of each way-station is provided with similar contacts 18ª and 21ª which coöperate with stationary contacts 19ª, 20ª and 22ª, 23ª. When these master switches are in normal position (see Fig. 2) these contacts close shunts in the right and left-hand lines, which in effect cause the right and left-hand sides of both the transmitting and receiving instruments to be out of circuit. The contact 19ª is longer than the contact 20ª, and the contact 22ª is longer than the contact 23ª, so that in the intermediate position of the master switch S¹ of a way-station shown in Fig. 4, contacts 19ª and 22ª are still in engagement with switch contacts 18ª and 21ª, while the connection wire 54 to the left-hand line wire, and thus to the next station. At the way-station, Fig. 2, the circuit from the left-hand line wire is traced as follows: by wire 55, contact 22ª, contact 21ª of the master switch S¹, contact 23ª, wires 56, 57, relay 51, and wire 58 to the next section of the left-hand line wire. At the last way-station the left-hand line circuit may be traced in the same manner, except that the left line wire L is led, by wire 59, contacts 22ª, 21ª, 23ª, wires 60, 61, relay 51, and wire 58, to ground by way of split resistance 47 and wire 48.

When the master switch S at the despatcher's station is in shifted position indicated by dotted lines in Fig. 1, the right and left-hand line circuits at that station are as follows: Current after flowing through the right-hand coil 13 of the receiver passes by way of wire 42 and wire 63 to the right-hand contact 6 of the transmitter, thence through as many coils of the rheostats 8 as are included in circuit to the wire 64, and thence to the right-hand line wire leading to the next station. Current after flowing through the left-hand coil 12 of the receiver passes by way of wire 42 and wire 65 to the left-hand contact 6 of the transmitter, thence through as much resistance of the left-hand rheostat 8 as is included in series, to the wire 66, connecting with the wire 54 leading to the left-hand line wire L.

At a way-station, with the master switch S¹ in the intermediate position shown in Fig. 4, the right and left-hand line circuits are traced as follows: Current passes from the right-hand line wire R to wire 67, thence through the right-hand coil 13 of the receiver of this station, by wire 68 to wire 24 (already referred to), to contact 18ª of the master switch S¹, to stationary contact 19ª, and thence by wire 46 to the section of the right-hand line wire R leading to the next station (or to ground if it be the last way-station on the line). In the left-hand line circuit, current passes from the left-hand line wire L entering the station, to wire 55, to contact 22ª, to contact 21ª on the master switch, and thence by wire 25 (already referred to), to wire 69, thence through the left-hand coil 12 of the receiver, by wires 70 and 57 to the relay 51, and thence by wire 58 to line or to earth as the case may be.

In the third position of the master switch S¹ of a way-station shown in Fig. 3, the path of current in the right and left-hand line circuits is as follows: from incoming line wire R, by wire 67 to right-hand coil 13 of the receiver, to wire 68, to wire 71, to right-hand contact 6 of the transmitter of that station, thence through as much of the resistance of rheostat 8 as is included in series to wire 72, and thence to wire 46 and back to line or to ground as the case may be. In the left-hand line circuit current from the left-hand line wire L enters the coils of the left-hand rheostat of the transmitter by way of wire 73, thence by left-hand traveling contact 6 and its supporting arm, to wire 74, thence by wire 69 to the left-hand coil 13 of the receiver, thence by wires 70 and 61 to relay 51, and thence by wire 58 to the outgoing left-hand line wire or ground as the case may be.

Normally no current is traversing the right and left-hand line circuits, but current is on the third main line circuit employing the line wire P; and this third main line circuit is employed to open and close the right and left-hand main line circuits. At the despatcher's station, Fig. 1, this third line circuit is traced as follows: from the positive brush of the generator 1, by wires 26, 29, 75, to relay 31, which it energizes, thereby attracting armature 30 and holding it against its front stop so as to open the right and left-hand main line circuits, by wire 76 to relay 77, through the coil thereof to wire 78, thence to contact 79, to a contact 80 on the main switch S, to another stationary contact 81, and thence to the main line wire P leading to the next way-station. At the way-stations, current from the line wire P passes through the coil of the relay 77 to wires 78$^a$, thence to stationary contact 79$^a$, to contact 80$^a$ on the master switch S$^1$, to stationary contact 81$^a$, and thence to line wire P leading to the next station or by way of wires 82 and 48 to ground, according as the station is an intermediate way-station or the last way-station of the line.

At the despatcher's station and each of the way-stations there is an auxiliary circuit pertaining to this third line circuit and consisting of wires 83, 84, connecting with the wires 78 or 78$^a$ and P of the third line circuit, wire 83 connecting with the platen-operated switch 9 of the transmitter and wire 84 including a resistance V. Through this auxiliary circuit the raising and lowering of the local and distant receiver pens is controlled by the operator at the station which is transmitting. In the normal position of the master switch S of the despatcher's station, and in both the normal and intermediate positions of each master switch S$^1$ of a way-station, both stationary contacts 79 and 81 or 79$^a$ and 81$^a$ are in electrical connection with the contact 80 or 80$^a$ on the master switch, so that this auxiliary circuit 83, 84 is shunted out of the line P. When, however, the master switch S of the despatcher's station is moved to the shifted position shown in dotted lines in Fig. 1 (or transmitting position) or the master switch S$^1$ of a way-station is moved to the third position shown in Fig. 3 (or transmitting position), the connection between contacts 79 and 81 or 79$^a$ and 81$^a$ is broken, and the auxiliary circuit thus thrown into line P; this auxiliary circuit, and therefore the circuit P, being open, so long as the platen switch 9 remains raised, as it will except when, in writing, the operator depresses it by the pressure of his hand or tracer 3 upon the writing platen.

The breaking of the main line circuit P closes the main line circuits R and L, because the deënergization of relay 31 permits its armature to move against the back contact, thereby closing the break at this point in the circuit of which R and L are branches. This is the condition which is presented by the position of the master switch S$^1$ in Fig. 3 of the drawings, and it will be obvious that so long as the platen switch 9 remains in the raised position in which it is shown, the circuit through the pen-lifting line P will be opened, and the armature 85 of the relays 77 of that station and of the despatcher's station (Fig. 1) and incidentally that of the intermediate way-station (Fig. 2), will rest against their back stops because of the deënergization of said relays. Through the armature 85 just referred to a local circuit in the receiver from battery 2 is opened and closed which controls the raising and lowering of the receiving pen, so that, as the transmitting tracer rests upon the platen in writing, or is raised therefrom, the receiving pen will be lowered or raised therefrom, respectively, in like manner. This will be more fully explained after the description which will now be given of the other functions of the third line circuit P, which in addition to controlling the pen-lifting circuit, also controls signaling between stations, locking and releasing of the master switches at distant stations, and clearing of the right and left-hand writing lines.

A signaling circuit is provided at each station comprising for the despatcher's station the wire 88 leading from the battery 2, lock magnet 119$^a$, wires 90, 91, armature 85 of relay 77, back contact 92 thereof, the wire 93, bell magnet 94, armature 94$^a$, wire 95, back contact 96, armature 97 of relay 51, and wire 98 leading back to the other pole of the battery.

A selective signal circuit is provided for each of the way-stations (Figs. 2, 3 and 4) and consists of wire 88 from the positive pole of battery 2, armature 85, back stop 92, wires 99, 164, signal selecting magnet 163, wires 165, 104, back stop 96, armature 97 of relay 51, and wire 98, back to battery 2.

Normally the armatures 97 of relays 51, in the several stations, rest against their back stops, because no current is passing through either of the writing lines R, L, but the ararmatures 85 are against their front contacts 86 because current is passing through the third main line P. To signal from the despatcher's station, the rheostat arm 35 is swung to the right against the tension of its spring into engagement with the switch 28, which it depresses against the tension of its spring, thereby opening the lead from the positive brush of the dynamo at the contact 27. This opens the third main line circuit P, so that armature 85 of the relay 77 at each station moves against its back stop 92; and the opening of this lead also breaks the connection between the generator 1 and the main line circuits R and L, deënergizing the relay 51. The armatures 85 and 97 at each station now both rest against their back stops 92 and 96, and the selective signaling circuits at the several stations are closed. By operating the rheostat switch 35, 28 a predetermined number of times to open and close the selective signaling circuits at the way stations, a bell or other signal will be operated at the desired way station. It will require a different number of movements of the rheostat switch to ring each way station. Thus, the despatcher may select and call any desired way station. The manner in which the bells are operated by the selective signaling system will now be described. On the other hand, the operator at one of the way stations who wishes to call the despatcher's station, does so by moving the master switch S' to its third position shown in Fig. 3, and then begins to write his message, visual indication thereof being made to the despatcher by the record being made in his receiver.

The magnet 165 has an armature 166 which is drawn away from the magnet against a back stop 167 by a spring 168. To this armature is pivoted a dog 169, which engages the teeth of a ratchet wheel 170. The spring 168 is secured to the dog 169, so as to insure the engagement thereof with the ratchet teeth; but a stop 171 limits the movement of the dog under the action of this spring. In the normal positions of these parts, as shown in the several views, the working tip or pin of the dog 169 does not intersect the circular path of travel of the ratchet teeth, with the exception of one long stop tooth 172 on each ratchet. When the armature 166 is attracted by the magnet, the dog is pushed against a tooth of the ratchet, which is advanced one tooth. The magnet is then deënergized and the spring 168 pulls the armature and dog back in readiness to engage the next tooth of the ratchet. At the next energization of the magnet the ratchet is advanced another tooth. The ratchet is held from retrograde movement by a detent lever or pawl 173. When the ratchet wheel has been advanced a predetermined number of teeth (a different number for each station) a bell circuit is closed to sound a signal. This is effected by a contact 174 on the ratchet wheel, which contacts with another contact, which may be the detent lever 173. It will be understood that normally there is no electrical connection between 173 and 174, the gap not being closed until they touch. At a way station the bell circuit may be traced as follows: battery 2, wires 88, 117, 175, 176, contact 174, detent lever 173, wire 177, bell magnet 102, the armature 101 thereof, wires 100, wires 113b, 104, back stop 96, armature 97, and wire 98, back to the other side of the battery. Thus, when contacts 173 and 174 are together, and armature 97 is against its back contact 96, where it always is when the several master switches are in normal position, the bell will be sounded. The bell will continue to sound at the selected way-station until the operator there moves his master switch to third, or transmitting position, to acknowledge the call, as by writing his station number or sign. The master switch S' breaks the third line circuit P in this position, as already explained, and the breaking of this line circuit causes the other line circuits R and L to be closed. The closing of L energizes the relay 51, so as to attract its armature against the front contact 116, and away from the back contact 96, thus breaking the bell circuit. At the same time, the ratchet 170 is caused to return to normal position. This is effected in the following manner: A releasing magnet 178 is included in a local circuit controlled by the armature 97 of relay 51, which circuit may be traced from the battery 2 by wires 88, 117, 175, 179, magnet 178, wires 180, 181, front contact 116, armature 97, and wire 98, back to the other side of the battery. This circuit is closed by the attraction of the armature 97 against its front contact, as just set forth, thus energizing magnet 178 and attracting its armature forming the tail of detent lever 173. Lever 173 is consequently disengaged from the teeth of the ratchet which is allowed to rotate in the retrograde direction under the energy stored in its spring 182. This retrograde movement of the ratchet continues until the long stop tooth 172 abuts against the dog 169, thus bringing the ratchet to rest in normal position. This occurs at all the stations. When the magnet 178 is deënergized, the detent lever 173 is reëngaged with the ratchet by the spring 182.

Means are provided whereby when the master switch at any way station is in normal position or has been moved from that position to its second or intermediate position, it is locked against movement from such position by the operator of that station. Means are also provided whereby the switches at the way stations may be released and caused to return to normal position, this means being operable from the despatcher's station. Each of the way-station switches S' is provided with an arm 104ª pivoted thereto and provided with two detent teeth 105 and 106, these teeth being beveled on their advancing sides and having abrupt holding faces on their rear sides, so as to latch by and lock with the pivoted detent 107, having a detent head beveled on one side and abrupt on the other side. The detent lever 107 is normally pressed forward by a spring 108 against a stop 109. The tooth 105 is longer than the tooth 106. The tooth 105 engages first with the head of the detent 107, and serves to hold the master switch S' in the intermediate position shown in Fig. 4, against the tension of the spring 110, which holds the arm 104ª against the detent 107, and also serves to restore the master switch to normal position when the switch is released. A stop 111 is provided in rear of the arm 104ª, and the distance between this stop and the arm is such that the arm cannot be swung sufficiently far from the detent 107 to enable the tooth 105 to clear the detent head on the detent. The detent 107 will yield, however, in order to permit the tooth 106 to latch by the detent on movement of the switch S' to third position, shown in Fig. 3. The operator at the way-station after moving to such third position can move his master switch back to intermediate position, by inserting the point of his transmitting stylus in the socket 112 in the end of the arm 104ª, and thereby swinging the arm to the left sufficiently to disengage the tooth 106 from the head of the detent 107; but he cannot in this way disengage the tooth 105 from the detent. In other words, the operator can move his master switch from normal to third position or from normal to second and then to third position, and can return his switch from third to second position, but cannot restore it to normal position after once shifting it therefrom. It will be understood that the detent 107 is inclosed in the casing of the instruments so that it is not accessible to the operator. The detent 107 may be retracted so as to clear the long tooth 106 thereby causing the master switch S' to return to normal position under the action of the spring 110. This releasing of the master switch of a way-station and the restoration to normal position is under the control of the operator at the despatcher's station. To this end, a release magnet 113 is included in a branch of the selective signaling circuit at each way-station, by means of the wires 113ª and 113ᵇ, so that whenever the operator at the despatcher's station operates the rheostat switch 28 to send a calling signal, any master switch at a way station is automatically released and caused to return to normal position, thus clearing the line. Of course, this action takes place whether the detent 107 is in engagement with either the tooth 105 or the tooth 106, that is, whether the master switches of the way-stations are either at intermediate or third position. A stop 114ª limits the movement of the arm 104ª to the right under the action of the spring 110. At the despatcher's station a similar arm 104 is pivoted to the master switch S, and this arm and the master switch are under the influence of a similar spring 110. A stop 114 at the despatcher's station limits the movement of the arm 104 to the right under the action of the spring, and also constitutes an abutment for engagement by the single tooth 115, to hold or lock the master switch S in its shifted position. This lock is releasable by the operator by inserting the point of his transmitting stylus in the socket 112 to swing the arm 104 to the left.

Means are provided for locking the master switch S' at each way-station against movement either in normal position, with both instruments out of circuit, or in intermediate position, that is, with the receiver in circuit, as long as current is on the main writing line. This is to prevent any way-station operator cutting in on a busy line, or to prevent the operator at a way-station receiving the message from the transmitter station from shifting his switch so as to interrupt the reception of the message. Means are likewise provided for locking the master switch S' at the despatcher's station in normal position with the receiver in circuit and the transmitter out of circuit, when current is on the main writing lines, as when a way-station has shifted its switch to third or transmitting position in readiness to send a message to the transmitter station. This locking of the master switches is under the control of left-hand line L alone, and is effected whenever the armature 97 of a relay 51 is attracted against its front contact 116, thereby closing a local circuit, which is traced at a way-station (Figs. 2 to 4), as follows: from battery 2 by wire 88 to wires 117, 118, through the coil of locking magnet 119 to wire 120, to contact 121 on master switch S', to stationary contact 122, wire 123, wire 181, contact 116, armature 97, and by wire 98 back to the other side of the battery. The contact 122 is of such length that it is in electrical connection with the switch contact 121 in both the normal and intermediate or receiving positions of the switch S', but it is separated from the said contact when the master switch S' is in third or transmitting position. It follows, therefore, that the locking magnet 119 is energized by current on the left hand writing line, when the master switch S' is in either normal or receiving positions, but not when the switch is in transmitting position. The magnet 119 locks the switch against movement in either of these first two positions by means of an armature 124, having two locking projections 125, and 126, corresponding to said two positions of the switch and positioned to engage with a tail piece 127 rigidly fixed thereto. The locking armature 124 is normally pressed rearward by a spring 128, so as to release said tail piece. A lamp 129 is located in a shunt in this circuit so as to display a busy signal whenever the master switch S' of a way-station is locked by virtue of current being on the writing line. Thus it will be seen that the locking armature 124 will lock a switch S' against being moved out of normal position, or if in intermediate position the projection 125 locks it against movement to third or transmitting position. In such intermediate position the detent 107 engaging with the long tooth 105 locks the master switch S' against return from intermediate or receiving position to normal, or the tooth 126 on the armature 124 would also prevent movement of the switch in this direction as long as current is on the writing line. The detent 107, it will be observed, locks the master switch S' against return to normal position from intermediate or receiving position, whether current be on the lines or not. As will be obvious, suitable stops, such as 130 will be provided for preventing the master switches from being moved in the wrong direction from normal position and for limiting their movement under the action of the springs 110. At the despatcher's station there is a similar local locking circuit including the wire 88, magnet 119ª (having armature lock 124ª), wire 90, wire 133, paper shifting magnet 15, wires 134, 189, front contact 115, armature 97 of the relay 51, and wire 98 to the other side of the battery 2.

It will be observed that the several master switches are disengaged from the lock 124 or 124ª, as well as from the locking detent 107, whenever the operator at the despatcher's station manipulates the rheostat switch 28 so as to clear the line and to send a calling signal to any one of the stations.

Means are provided for shifting the paper at the receiver of any station, whenever the writing line circuits are closed and when the master switch of that station is in either transmitting or receiving position. At the despatcher's station the local circuit for effecting this paper feeding includes the wire 88, locking magnet 119ª, wires 90, 133, paper-shifting magnet 15, wires 134, 189, front contact 115, armature 97 and wire 98 back to the other side of the battery. This local circuit is closed in either of the two positions of the master switch S' whenever the armature 97 is attracted by the relay 51 due to the passage of current through the left-hand line circuit L, in which said relay is included.

closed main line circuit P, is attracted by that relay against its front stop 86; but the right and left-hand main line circuits are normally broken, so that the relay 51 included in the left-hand line circuit is deenergized and permits its armature 97 to rest against the back stop 96, thereby opening the local circuit controlling the pen-lifting magnet 16, so that the receiving pen is held raised when in the normal or unison position of Fig. 2. When one station is writing a message to another, the master switch of the sending station being in transmitting position, as in Fig. 3, and the master switch of the receiving station being in receiving position, as is the case with the master switch of the despatcher's station of Fig. 1, the master switch, as S″, in transmitting position, has opened the main line circuit P at 80ª, thus deënergizing the relay 31, as already explained, so as to cause current to flow through the right and left-hand lines R and L, thereby causing the relays 51 to attract their armatures 97 against the front stops 116. The breaking of this circuit P also deënergizes the relays 77 of the sending and receiving stations, the armatures 85 of which are then against their back contacts 92. This condition of the armatures 97, 85 continues while platen switch 9 remains in the elevated position shown (Fig. 3), and as the transmitting tracer 3 is moved laterally by the operator, the receiving pen of Fig. 3 and Fig. 1 will be correspondingly moved at a distance from the paper. When, however, the transmitting tracer is lowered to writing position upon the writing platen and the latter and, with it, platen switch 9, is depressed by the pressure of the operator's hand, switch 9 will engage under contact 142, thus closing the third line circuit P through the auxiliary circuit 83, 84, and the resistance V which permits enough current to flow over line P to energize relays 77, the armatures 85 of which will then rest against their forward contacts 86, thus closing the pen-lifting circuits from batteries 2 through pen-lifting magnets 16, which will cause depression of pen rests 17 and permit the receiving pens to contact with the record strips. When the writing platen is relieved from the pressure of the operator's hand, the circuit P is, of course, broken and also the local pen-lifting circuits, so that the receiving pens will be moved by pen rests 17 away from the record strips. Thus, relay 77 controls pen lifting and lowering during writing.

The local pen-lifting circuit at Fig. 1, includes the battery 2, the wire 88, magnet 110ª, wires 90, 91, the armature 85 of relay 77, front contact 86, wire 140, magnet 16, wire 141, wires 124, 189, front contact 116, armature 97, and wire 98, back to the battery. The local pen-lifting circuit at any of the way-stations, Figs. 2, 3 or 4, includes battery 2, wire 88, armature 85 of relay 77, front contact 86, wire 140, pen-lifting magnet 16, wire 141, wire 138, master switch contact 135, stationary contact 122, wire 123, wire 181, front contact 116, armature 97 of relay 51 and wire 98, back to the other side of the battery. It will be seen that this circuit at a way-station includes the contacts 135 and 122 on the master switch, which are in electrical connection at intermediate or receiving position and at third or transmitting position, but are disconnected at normal position. Consequently, the local pen-lifting circuit is open at this point at each of the way-stations when the master switch thereof is in normal position with both instruments out. Therefore, the receiving pen at any station not engaged in sending or receiving a message will not have its receiving pen raised and lowered. In like manner, as already pointed out, the local circuit of the paper-shifting magnet 15 of the receiver of each way-station includes these same two contacts 135 and 122, so that the paper will not be advanced at any station not engaged in sending or receiving a message.

The rheostat 36 at the despatcher's station is for the purpose of gradually weakening the current in the right and left-hand writing lines R and L before these circuits are broken, so that in clearing the lines the receiving pens will not be moved to a unison position in a violent manner.

Means employing the same line circuits are also provided for telephonic communication between the stations. As illustrated, a telephone set is connected across the right and left-hand lines R and L at each station. The primary or transmitter circuit thereof includes a battery 143, transmitter 144, contact 146, receiver arm 147, contact 148, and primary winding 149 of the induction coil. The secondary circuit to the distant station utilizes the right and left-hand lines R and L. At the sending station this circuit includes receiver arm 147, wire 150, secondary winding 151 of the induction coil and condenser 152. At the receiving station it includes condenser 152, wire 153, receiver 154, contact 148, and receiver arm 147.

The operation of the system will now be briefly considered.

It will be remembered that normally no current is traversing the right and left-hand writing lines R and L, but that current is on the third main line P, and that it is the fact of the full current strength being on the line P that holds the right and left-hand lines open by means of the switch 51 controlled by the circuit P. When the despatcher desires to call a station he moves the rheostat arm 35 until it opens the switch 28, which open a lead from the generator 1, thereby breaking all three of the main line circuits R, L and P. This results in both relays 51 and 77 at each way-station being deënergized, so that the armatures 97 and 85 thereof complete the local selective signaling circuits at the several stations. By opening and closing the switch 28, a predetermined number of times, a signal will be sounded at the desired station. After signaling, the despatcher allows the rheostat arm 35 to return to its normal position under the action of its spring. In answering, the operator at the selected way-station moves his master switch S' into its extreme forward position (see Fig. 3). In this position, both the transmitter and the receiver shunts are opened, and, consequently, both instruments are in series with the right and left-hand lines R and L. In this position of the master switch S', the third main line circuit P is opened at 80ª, so that the switch relay 31 permits its armature to move against its back stop, thereby closing the right and left-hand line circuits R and L. The master switch S at the despatcher's station is still in normal position, that is, with the receiver in and the transmitter out. As the two sides of the transmitter of the way-station are now in series with the right and left-hand lines, the strength of current flowing over these lines may be varied by the movements of the transmitting stylus in moving the contact rollers over the rheostats 8, thereby introducing more or less resistance into the two lines. The receiving instrument at this way-station and at the despatcher's station being in series with the right and left-hand lines, the variations in the strength of the line currents will cause corresponding movements in the receiver pens at the two stations. The operator at the way-station now replies by writing his station sign or name, which is recorded on both the way-station receiver and the despatcher's receiver, and serves as a heading for that particular order. Having done this, the operator at the way-station moves his master switch S'' to intermediate or receiving position, shown in Fig. 4, thus cutting out his transmitter, the receiver remaining in, and the operator at the despatcher's station shifts the master switch S to the dotted line position of Fig. 1, thus cutting in the transmitter in addition to the receiver. The operator at the despatcher's station now proceeds to write the train order or message, which is recorded on the receiver of the despatcher's station and the receiver of the way-station. Pen-lifting and lowering is controlled in the manner already described.

A way-station having once cut in on the writing lines cannot cut out by returning its master switch to normal position. Only the despatcher can disconnect the way-station or clear the line, which he does when his communication is completed. Any calling signal set by the despatcher's station automatically clears the line, by releasing the locking devices 107 and 124. When the despatcher's station is writing to a way-station or vice-versa, the master switches of all the other way-stations are locked in normal position with their instruments cut out. Way-station operators can write to the despatcher at any time when the lines are not busy by simply cutting in their stations; but the operator at the despatcher's station can at any time interrupt the message and clear the lines by means of the rheostat switch 28. The operator at a way-station, when receiving a message from the despatcher's station, the way-station switch S'' then being in intermediate or receiving position, not only cannot return his switch to normal position, because of the locking device 107, but is also prevented from moving it to transmitting position, by virtue of the locking device 124.

The induction coil I and the interrupter magnet 40 are used to produce vibratory induced currents in the right and left-hand lines for the purpose of overcoming the friction in the moving parts of the receiving instruments. For this purpose interrupter magnet 40 is included in a circuit from generator 1, consisting of wire 26, switch 28, wire 29, armature 30 of relay 31, wire 33, wire 155 to magnet 40, wire 156, armature 157, contact 158, primary winding 159 of induction coil I, and wire 160 to ground. This circuit is closed, at 32, when relay 31 is deenergized and current is therefore on the writing lines, but it is constantly interrupted at 158 with the result that vibratory currents are induced in the main writing lines, which vibrate the moving parts in the local and distant receivers, thereby facilitating their movement. A shunt circuit 161 with condenser 162 is provided around magnet 40 to reduce sparking.

The stations may also communicate with each other by means of the telephone connections employing the same lines as the telautograph apparatus.

It is obvious that the selective switches at the way-stations may be operated from the despatcher's station by the use of a form of interrupting switch arranged to interrupt the circuits a given number of times as required for calling each station, a type of switch which is commonly used in selective signaling.

What is claimed as new is:—

1. The combination of the receiving pen of a telautograph station, two movable coils controlling the lateral movements of the pen over its writing surface, a transmitter of a distant station including two rheostats and a platen, two line circuits connecting the two rheostats with the two coils, pen lifting and lowering means, and a third line circuit controlled by said platen and including means for controlling said pen lifting and lowering means.

2. The combination of a receiving pen and devices controlling the lateral movements thereof over its writing surface, two line circuits, a transmitter having devices for sending currents of varying strength through the two line circuits to said pen controlling devices to operate the same, receiving pen lifting and lowering means, and a third line circuit controlled by the transmitter and in turn controlling said pen lifting and lowering means.

3. The combination of a receiving pen and devices controlling the lateral movements thereof over its writing surface, two line circuits, a transmitter having a transmitting stylus and devices for sending currents of varying strength through the two line circuits to said pen controlling devices to operate the same, receiving pen lifting and lowering means, a local circuit for operating said means, and a third line circuit controlled by the transmitter on raising and lowering of the transmitter stylus and in turn controlling said local circuit.

4. The combination of a receiving pen and devices controlling the lateral movements thereof over its writing surface, two line circuits, a transmitter having a transmitting stylus and devices for sending currents of varying strength through the two line circuits to said pen controlling devices to operate the same, receiving pen lifting and lowering means, a local circuit for operating said means, a third line circuit controlled by the transmitter on raising and lowering of the transmitter stylus, and means whereby said local circuit is controlled by the last-named and one of the other line circuits jointly.

5. The combination of a receiving pen and devices controlling the lateral movements thereof over its writing surface, two line circuits, a transmitter having a transmitting stylus and devices for sending currents of varying strength through the two line circuits to said pen controlling devices to operate the same, receiving pen lifting and lowering means, a local circuit including a source of electric energy for operating said means, a third line circuit controlled by the transmitter on raising and lowering of the transmitter stylus, and relays in this circuit and in one of the other line circuits which when energized close said local circuit.

6. The combination with the receiver of a telautograph station, a call device at the station and a local circuit including a source of electric energy for operating said device, of two line circuits for operating the receiver from the transmitter of a distant station, and a normally closed third line circuit controlled by the transmitter and including means for controlling said local circuit.

7. The combination with the receiving instrument of a telautograph station, a call device at the station and a local circuit including a source of electric energy for operating the same, of right and left hand line circuits for operating the receiving instrument from a distant station, a third line circuit, and means whereby said local circuit is controlled by the last-named circuit and one of the other two line circuits jointly.

8. The combination with the receiving instrument of a telautograph station, a call device at the station and a local circuit including a source of electric energy for operating the same, of right and left hand line circuits for operating the receiving instrument from a distant station, a third line circuit, and relays in the last-named circuit and one of the other two line circuits which when deënergized close said local circuit.

9. The combination with the receiving pen of a telautograph station, a pen-lifting device and a local circuit for operating the same, a call device and a local circuit for operating the same, of the transmitter of a distant station including a transmitting stylus, two line circuits controlled by said transmitter and in turn controlling the receiving pen in its lateral movements over its writing surface, a relay in one of these line circuits, another line circuit controlled by said transmitter on raising and lowering of the transmitter stylus and a relay in the last-named circuit, said relays when both energized operating to close the local pen lifting circuit and when both deënergized to close the local call circuit.

10. The combination with the receiver of a telautograph station, a call device and a local circuit for operating the same, of normally open line circuits for operating said receiver from a distant station, a relay in one of these circuits, a switch adapted to close said line circuits, another line circuit including means for holding said switch open, a relay in the last-named circuit, said relays when both deënergized operating to close the local circuit, and a calling switch at the distant station for opening the line circuits containing said relays.

11. The combination with the transmitting and receiving instruments of distant telautograph stations, two normally open line circuits for operating the receiving instruments of one station from the transmitting instruments of the other and vice-versa, a switch adapted to close said line circuits, a third, normally closed line circuit including means for holding said switch open, and a switch for changing the condition of the last-named circuit so as to close the normally open line circuits.

12. The combination with the transmitting and receiving instruments of distant telautograph stations, of two line circuits for operating said receiving instruments in unison with the transmitting instruments, another line circuit including means normally holding the other line circuits open, and means for varying the strength of the currents traversing the last named circuit so as to control the opening and closing of the line circuits.

13. The combination with the transmitting instruments, transmitting stylus, receiving pens, and pen lifting and lowering devices of distant telautograph stations, two line circuits for operating the receiving pens from the transmitting instruments, another line circuit normally closed and including means normally holding said two line circuits open, means at the several stations controlled by the last-named circuit and in turn controlling said pen lifting and lowering devices, an auxiliary circuit at each station including a resistance, and a switch controlled by the transmitter on raising and lowering of the transmitter stylus to effect pen lifting and lowering and a master switch for introducing said auxiliary circuit in series with the last-named line circuit, said resistance reducing the current in this line so that the other line circuits are closed.

14. The combination with the receiving pen of a telautograph station, and pen lifting and lowering means therefor, of the transmitter and transmitting stylus of a distant station, two line circuits for operating the receiving pen in unison with the transmitter, another line circuit controlling said pen lifting and lowering means, a switch operated by the transmitter on raising and lowering of the transmitter stylus to open and close the last-named circuit, said switch being normally without effect upon said circuit, and a master switch for placing said switch in operative relation to said circuit.

15. In a telautograph system, the combination with a despatcher's station, way-stations and line circuits connecting the despatcher's and way-stations in series, each station comprising telautographic transmitting and receiving instruments, of master switches at the several stations, the master switch of the despatcher's station normally keeping the transmitting instrument thereof out of circuit and the receiving instrument in circuit, and the master switches at the way-stations normally keeping both instruments thereof out of circuit.

16. In a telautograph system, the combination with a despatcher's station, way-stations and line circuits connecting the despatcher's and way-stations in series, each station comprising telautograph transmitting and receiving instruments, of master switches at the several stations the master switch of the despatcher's station having two positions, in the normal position the transmitter thereof being out of circuit and the receiver in circuit and in the second position both being in circuit, and the master switch at each way-station having three positions, in the normal positions both instruments being out of circuit, in another position the receiver being in and the transmitter out, and in the third both instruments being in circuit.

17. In a telautograph system, the combination with a plurality of stations, each comprising telautographic transmitting and receiving instruments, of line circuits and master switches for connecting the stations, and means for locking the master switches of the other stations while one station is writing to another.

18. In a telautograph system, the combination with a plurality of stations, each comprising telautographic transmitting and receiving instruments, of line circuits and master switches for connecting the stations, and means for locking the other stations out of circuit and displaying busy signals thereat while one station is writing to another.

19. In a telautograph system, the combination with a plurality of stations each comprising telautographic transmitting and receiving instruments, of line circuits, master switches at the several stations for cutting the instruments thereof into and out of circuit, and means whereby when one station is writing to another the switches of the remaining stations are locked with their transmitting instruments out of circuit.

20. The combination with the transmitting and receiving instruments of a telautograph station, of line circuits and master switch mechanism in one position of which both instruments are out of circuit and in another position of which the receiving instrument is in circuit and the transmitting instrument is out of circuit, and means for locking the switch mechanism in either of these positions when current is on line.

21. The combination with the transmitting and receiving instruments of a telautograph station, of line circuits and switch mechanism in one position of which both instruments are out of circuit and in another position the receiving instrument is in and the transmitting instrument out while in a third position the transmitting instrument is in circuit, and means for locking the switch mechanism in either of the first two positions but not in the third while current is on line.

22. The combination with the transmitting and receiving instruments of a telautograph station, of line circuits and switch mechanism in one position of which both instruments are out of circuit and in another position the receiving instrument is in and the transmitting instrument out while in a third position both instruments are in circuit, and means for locking the switch mechanism in either of the first two positions but not in the third while current is on line.

23. The combination with the transmitting and receiving instruments of a telautograph station, of master switch mechanism in one position of which both said instruments are out of circuit and in another position of which the receiving instrument is in circuit with a distant station, and means releasable from a distant station for holding the switch mechanism against movement to the first-named position.

24. The combination with the transmitting and receiving instruments of a telautograph station, of main line circuits, and switch mechanism for cutting said instruments in and out of circuit, of means for holding said switch mechanism irrespective of current being on or off the main line circuits, and means operable from a distant station for releasing said switch mechanism.

25. The combination with the transmitting and receiving instruments of a telautograph station, of switch mechanism in the normal position of which both said instruments are out of circuit and in another position of which the receiving instrument is in and the transmitting instrument is out of circuit with a distant station, while in a third position both instruments are in circuit with the distant station, and means whereby when the switch mechanism has been moved out of normal position it cannot be returned thereto but must be released from a distant station.

26. The combination with the transmitting and receiving instruments of a telautograph station, of line circuits for connecting the instrument with a distant station, a switch mechanism for cutting the instruments into and out of circuit, a calling circuit, and means for causing the switch mechanism to move to a certain position when current is on the calling circuit.

27. The combination with the transmitting and receiving instruments of a telautograph station, of line circuits for connecting the instruments with a distant station, a switch mechanism for cutting the instruments into and out of circuit, a signaling means, and means whereby the sending of a calling signal from a distant station causes said switch mechanism to assume a position with the transmitting instrument out of circuit.

28. The combination with the transmitting and receiving instruments of a telautograph station, of switch mechanism for cutting the instruments into and out of circuit, in one position of which both instruments are out of circuit with a distant station, signaling means, and means whereby the sending of a calling signal from the distant station causes said switch mechanism to assume this position.

29. The combination with the transmitting and receiving instruments of different telautograph stations, of line circuits for connecting the stations, switch mechanisms for cutting the instruments of the several stations into and out of circuit, means for signaling to the stations, and means whereby the sending of a calling signal automatically clears the line.

30. The combination with the transmitting and receiving instruments of different telautograph stations, of line circuits for connecting the stations, switch mechanisms for cutting the instruments of the several stations into and out of circuit, means for signaling from one station to the others, and means whereby the sending of a calling signal automatically causes the switch mechanisms of the other stations to assume a certain position.

31. The combination with the transmitting and receiving instruments of a telautograph despatcher's station and the transmitting and receiving instruments of telautograph way-stations, of line circuits for connecting the stations, means for cutting the instruments of the way-stations into and out of circuit, and means for signaling from the despatcher's station to the way-stations and simultaneously clearing the line.

32. The combination with the transmitting and receiving instruments of a telautograph station, of manually operable switch mechanism at said station for cutting said instruments in and out of circuit with a distant station, and means for signaling to the station from a distant station and causing said switch mechanism to move from one position to another.

33. The combination with the transmitting and receiving instruments of a telautograph station, of manually operable switch mechanism at said station for cutting said instruments into and out of circuit with a distant station, means for holding the switch mechanism, and means for signaling to the station from a distant station and for releasing said holding means and causing the switch mechanism to move from one position to another.

34. The combination with the transmitting and receiving instruments of a telautograph station, of manually operable switch mechanism at said station for cutting said instruments into and out of circuit with a distant station, means for holding said switch mechanism, and means operable from a distant station for releasing said holding means and causing the switch mechanism to move from one position to another.

35. The combination with the transmitting and receiving instruments of a telautograph station, of manually operable switch mechanism at said station for cutting said instruments into and out of circuit with a distant station, and means operable from a distant station for causing said switch mechanism to assume a position in which both instruments are out of circuit.

36. The combination with the transmitting and receiving instruments of a telautograph station, of manually operable switch mechanism at said station for cutting said instruments into and out of circuit with a distant station, in one position of which both instruments are out of circuit, means for locking the switch mechanism against movement to this position and means operable from a distant station for releasing the switch mechanism and causing it to move to said position.

37. The combination with the transmitting and receiving instruments of a telautograph station, a manually operable switch at said station for cutting said instruments into and out of circuit with a distant station, means tending to move the switch in one direction, and means for holding the switch against such movement, of a call device and a circuit for operating the same, and means operated by said circuit for releasing the switch.

38. The combination with the transmitting and receiving instruments of a telautograph station, a manually operable switch at said station for cutting said instruments into and out of circuit with a distant station, of a step-by-step call device and a circuit for operating the same, and means controlled by the arrival of the call device at a predetermined position for moving the switch from one position to another.

39. The combination with the transmitting and receiving instruments of a telautograph station, two line circuits for connecting said instruments with a distant station, and a master switch for cutting said instruments into and out of circuit, of a third line circuit, and means controlled thereby and in turn controlling said switch.

40. The combination with the transmitting and receiving instruments of a telautograph station, main line circuits for connecting the same with a distant station, and a switch for cutting said instruments into and out of circuit, of means for controlling said switch, a call device, a local circuit for operating said means and said call device, a third line circuit, and means whereby said local circuit is controlled by the last-named line circuit and one of the other line circuits.

41. The combination with the transmitting and receiving instruments of a telautograph station, of main line circuits for connecting the same with a distant station, a third line circuit, and a local circuit including a battery controlled by the last-named line circuit and one of the other line circuits jointly.

42. The combination with the transmitting and receiving instruments of a telautograph station, main line circuits for connecting the same with a distant station, and a switch for cutting said instruments into and out of circuit, of means for controlling said switch, a local circuit for operating said means, a third line circuit, relays whereby said local circuit is controlled by the last-named line circuit and one of the other line circuits, and a switch at a distant station controlling these two line circuits so as to close and open said local circuit.

43. The combination with the transmitting and receiving instruments of a telautograph station, of main line circuits for connecting the same with a distant station, a master switch in one position of which both instruments are out of circuit, in an intermediate position of which the receiving instrument is in and the transmitting instrument out of circuit, and in a third position of which the transmitting instrument is in circuit, detent means for holding said switch at either of its shifted positions, said means permitting said switch to latch by from intermediate to third position and being releasable by the operator at the station to permit the switch to return to intermediate but not to first position, means operable from a distant station for releasing the switch from said detent to return to first position, and a lock operated when current is on the main line circuits to lock the switch against movement in either shifted position.

44. The combination with the transmitting and receiving instruments of a telautograph station, of two main line circuits for connecting the same with a distant station, another circuit including means for making and breaking the main line circuits, and a switch for cutting said instruments into and out of circuit, said switch operating also to close and open the main line circuits by controlling the last-named circuit.

45. The combination with the transmitting and receiving instruments of a telautograph station, of two main line circuits for connecting the same with a distant station, another circuit including means for making and breaking the main line circuits, and a switch for cutting said instruments into and out of circuit, said switch operating also to close and open the main line circuits by controlling the last-named circuit, the relation of the switch and circuits being such that in one position both instruments are out of circuit and in another position the receiving instrument is in and the transmitting instrument out, in both of these positions the condition of the third circuit being such that the main line circuits are broken, while in a third position the transmitting instrument is in, the condition of the third circuit being such that the main line circuits are closed.

46. The combination with the transmitting and receiving instruments of a telautograph, of two main line circuits for connecting the same with a distant station, another circuit including means for breaking the main line circuits when full current strength is passing through it, a master switch for cutting said instruments into and out of circuit, and means whereby said switch cuts resistance into and out of the third circuit to cause the latter to make and break the main line circuits.

47. The combination with the transmitting and receiving instruments of a telautograph, of a master switch in the normal position of which both instruments are out of circuit with a distant station, and in another position of which the transmitter is in circuit, while in a third position the transmitter is out and the receiver in circuit, and detent means for holding the switch in its two shifted positions, said detent means being releasable by the operator at the station to permit the switch to pass from one shifted position to the other but not to return to normal position, and means operable from a distant station to release said detent means to free the switch for return to normal position.

48. The combination with the transmitting and receiving instruments of a telautograph station, of line circuits for connecting the same with a distant station, a master switch for cutting said instruments into and out of circuit with a distant station, a lock for the switch, a local circuit controlled by a line circuit for operating said lock, and a contact on the master switch also controlling said local circuit.

49. The combination with the transmitting and receiving instruments of a telautograph station, of line circuits for connecting the same with a distant station, a master switch for cutting said instruments into and out of circuit with a distant station, a paper feed device for the receiving instrument, a local circuit controlled by a line circuit for operating said device, and a contact on the master switch also controlling said local circuit.

50. The combination with the transmitting and receiving instruments of a telautograph station, of line circuits for connecting the same with a distant station, a master switch for cutting said instruments into and out of circuit with a distant station, pen lifting and lowering means for the receiving instrument, a local circuit controlled by a line circuit for operating said means, and a contact on the switch also controlling said local circuit.

51. The combination with the transmitting and receiving instruments of the stations of a telautograph system, and line circuits for connecting the same, of a combined rheostat and switch for weakening and then breaking the line circuits to cut out transmitting by the distant stations.

52. In a telautograph system, the combination of the telautographic instruments of a despatcher's station and a plurality of way-stations, line wires connecting the stations, call devices and local circuits for operating the same at the several way-stations, selective devices at the several way-stations controlling said local circuits, and means for operating said selective devices from the despatcher's station.

53. In a telautograph system, the combination of the telautographic instruments of a despatcher's station and a plurality of way-stations, line wires connecting the stations, call devices and local circuits for operating the same at the several way-stations, selective devices at the several way-stations controlling said local circuits, local circuits at the way-stations for operating said selective devices, and means whereby the last named local-circuits are controlled from the despatcher's station over the line wires.

In testimony whereof, I have hereunto set my hand, in the presence of two subscribing witnesses.

GEORGE STEELE TIFFANY.

Witnesses:
J. A. GRAVES,
S. E. BROWN.